United States Patent
Chang

(10) Patent No.: US 9,615,074 B2
(45) Date of Patent: Apr. 4, 2017

(54) METHOD FOR GENERATING TRANSLATION IMAGE AND PORTABLE ELECTRONIC APPARATUS THEREOF

(71) Applicant: Wistron Corporation, New Taipei (TW)

(72) Inventor: Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 375 days.

(21) Appl. No.: 14/173,784

(22) Filed: Feb. 5, 2014

(65) Prior Publication Data

US 2015/0092022 A1 Apr. 2, 2015

(30) Foreign Application Priority Data

Oct. 1, 2013 (TW) .............................. 102135574 A

(51) Int. Cl.
*H04N 13/00* (2006.01)
*H04N 13/02* (2006.01)

(52) U.S. Cl.
CPC ..... *H04N 13/0011* (2013.01); *H04N 13/0203* (2013.01); *H04N 13/0271* (2013.01)

(58) Field of Classification Search
CPC ........... H04N 13/0011; H04N 13/0203; H04N 13/0271
See application file for complete search history.

(56) References Cited

U.S. PATENT DOCUMENTS

| | | | | |
|---|---|---|---|---|
| 2,515,104 A | * | 7/1950 | Walker .................. | G03B 19/18 359/699 |
| 2,532,685 A | * | 12/1950 | Walker .................. | G03B 19/18 318/466 |
| 2,547,187 A | * | 4/1951 | Walker .................. | G03B 19/18 359/699 |
| 2,705,908 A | * | 4/1955 | Walker .................. | G03B 19/18 352/142 |

(Continued)

FOREIGN PATENT DOCUMENTS

CN    102404592 A    4/2012

OTHER PUBLICATIONS

Office action mailed on Apr. 5, 2016 for the China application No. 201310484575.0, p. 3 line 4-44, p. 4 and p. 5 line 2-6.

*Primary Examiner* — Sath V Perungavoor
*Assistant Examiner* — Philip Dang
(74) *Attorney, Agent, or Firm* — Winston Hsu; Scott Margo

(57) ABSTRACT

A method for generating a translation image includes first and second lenses capturing first and second images toward an object respectively, an image processing device calculating a depth of field of a pixel in the first image relative to the first lens according to a first vertical viewing angle between the pixel in the first image and the first lens, a second vertical viewing angle between a corresponding pixel in the second image and the second lens, and a distance between the first and second lenses, the image processing device calculating a horizontal viewing angle between the pixel in the first image and the first lens according to the depth of field, coordinates of the pixel in the first image, and the distance, and the image processing device generating a translation image according to the coordinates of the pixel, the depth of field, the distance, and the horizontal viewing angle.

8 Claims, 4 Drawing Sheets

(56) References Cited

U.S. PATENT DOCUMENTS

| | | | | |
|---|---|---|---|---|
| 6,163,336 A * | 12/2000 | Richards | ............ | G02B 27/0093 348/42 |
| 7,671,321 B2 * | 3/2010 | Perlman | ............... | H04N 5/3572 250/208.1 |
| 7,787,112 B2 * | 8/2010 | Rahn | .................. | G01N 21/4795 356/213 |
| 7,933,010 B2 * | 4/2011 | Rahn | .................. | G01N 21/4795 356/213 |
| 8,013,285 B2 * | 9/2011 | Perlman | ................. | H04N 5/357 250/208.1 |
| 8,288,704 B2 * | 10/2012 | Perlman | ............... | H04N 5/3572 250/208.1 |
| 2011/0037832 A1 * | 2/2011 | Gharib | ..................... | G02B 7/34 348/46 |
| 2011/0242279 A1 * | 10/2011 | Redert | ............... | H04N 13/0059 348/43 |
| 2011/0310226 A1 * | 12/2011 | McEldowney | .... | G01B 11/2513 348/46 |
| 2012/0019612 A1 * | 1/2012 | Choudury | .......... | H04N 13/0011 348/36 |
| 2012/0092462 A1 * | 4/2012 | Li | ...................... | G02B 27/2221 348/49 |
| 2012/0120069 A1 * | 5/2012 | Kodaira | ............ | G06F 17/30271 345/419 |
| 2012/0249752 A1 * | 10/2012 | Baba | ...................... | G02B 27/26 348/49 |
| 2013/0033582 A1 * | 2/2013 | Sun | ................... | H04N 13/0018 348/47 |
| 2013/0050449 A1 * | 2/2013 | Morohoshi | ........ | H04N 13/0203 348/54 |
| 2013/0128001 A1 * | 5/2013 | You | ................... | G06K 9/00208 348/47 |
| 2013/0147918 A1 * | 6/2013 | Kakuko | ............ | H04N 13/0203 348/46 |

* cited by examiner

METHOD FOR GENERATING TRANSLATION IMAGE AND PORTABLE ELECTRONIC APPARATUS THEREOF

BACKGROUND OF THE INVENTION

1. Field of the Invention

The present invention relates to an image forming method and a portable electronic apparatus thereof, and more specifically, to a method for calculating a corresponding horizontal viewing angle according to vertical viewing angles between pixels in images and lenses so as to generate a translation image and a portable electronic apparatus thereof.

2. Description of the Prior Art

With development of stereoscopic image technology, a portable electronic apparatus having a stereoscopic display function is widely applied in daily life, such as a 3D digital camera or a 3D phone. The conventional stereoscopic display method involves utilizing two lenses disposed on the portable electronic apparatus to capture images having different viewing angles respectively for forming corresponding left eye images and right eye images and then transmitting the left eye images and the right eye images to the left eye and the right eye. Accordingly, the left eye images and the right eye images received by the two eyes are matched as a stereoscopic image that has focal range and gradation according to a discrepancy between the viewing angles of the two eyes.

However, in the aforesaid method, the portable electronic apparatus needs to be placed transversely to make the two lenses disposed thereon arranged from right to left relatively, so as to generate the left eye images and the right eye images having different horizontal viewing angles. That is, if the two lenses of the portable electronic apparatus are arranged vertically, the portable electronic apparatus could not generate the stereoscopic image since the two lenses could only capture the images having the same horizontal viewing angle. Thus, the aforesaid method causes a user much inconvenience in operating the portable electronic apparatus to generate stereoscopic images.

SUMMARY OF THE INVENTION

An objective of the present invention is to provide a method for calculating a corresponding horizontal viewing angle according to vertical viewing angles between pixels in images and lenses so as to generate a translation image and a portable electronic apparatus thereof, to solve the aforesaid problem.

The present invention provides a method for generating a translation image. The method is applied to display of stereoscopic images. The method includes a first lens capturing a first image toward an object, a second lens capturing a second image toward the object, the first image and the second image having different viewing angles, an image processing device calculating a depth of field of at least one pixel in the first image relative to the first lens according to a first vertical viewing angle between the at least one pixel in the first image and the first lens, a second vertical viewing angle between a corresponding pixel in the second image and the second lens, and a distance between the first lens and the second lens, the image processing device calculating a horizontal viewing angle between the at least one pixel in the first image and the first lens according to the depth of field of the at least one pixel in the first image relative to the first lens, coordinates of the at least one pixel in the first image, and the distance, and the image processing device generating a translation image according to the coordinates of the at least one pixel in the first image, the depth of field of the at least one pixel in the first image relative to the first lens, the distance, and the horizontal viewing angle.

The present invention further provides a portable electronic apparatus. The portable electronic apparatus includes a first lens, a second lens, and an image processing device. The first lens is for capturing a first image toward an object. The second lens is located at a side of the first lens for capturing a second image toward the object. The first image and the second image have different viewing angles. A distance is formed between the first image and the second image. The image processing device includes a processing unit coupled to the first lens and the second lens. The processing unit is for calculating a depth of field of at least one pixel in the first image relative to the first lens according to a first vertical viewing angle between the at least one pixel in the first image and the first lens, a second vertical viewing angle between a corresponding pixel in the second image and the second lens, and the distance. The processing unit is further for calculating a horizontal viewing angle between the at least one pixel in the first image and the first lens according to the depth of field of the at least one pixel in the first image relative to the first lens, coordinates of the at least one pixel in the first image, and the distance. The processing unit is further for generating at least one translation image according to the coordinates of the at least one pixel in the first image, the depth of field of the at least one pixel in the first image relative to the first lens, the distance, and the horizontal viewing angle.

In summary, via the aforesaid steps of calculating the depth of field according to the vertical viewing angles and calculating the horizontal viewing angle according to the depth of field, the present invention could still generate the translation image to form the stereoscopic image for the subsequent stereoscopic display of the portable electronic apparatus even if the two lenses of the portable electronic apparatus are not arranged transversely. In such a manner, the present invention could effectively solve the prior art problem that the portable electronic apparatus could not generate the stereoscopic image when the two lenses of the portable electronic apparatus are not arranged transversely, so as to greatly improve operation convenience and elasticity of the portable electronic apparatus in capturing images for forming stereoscopic images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
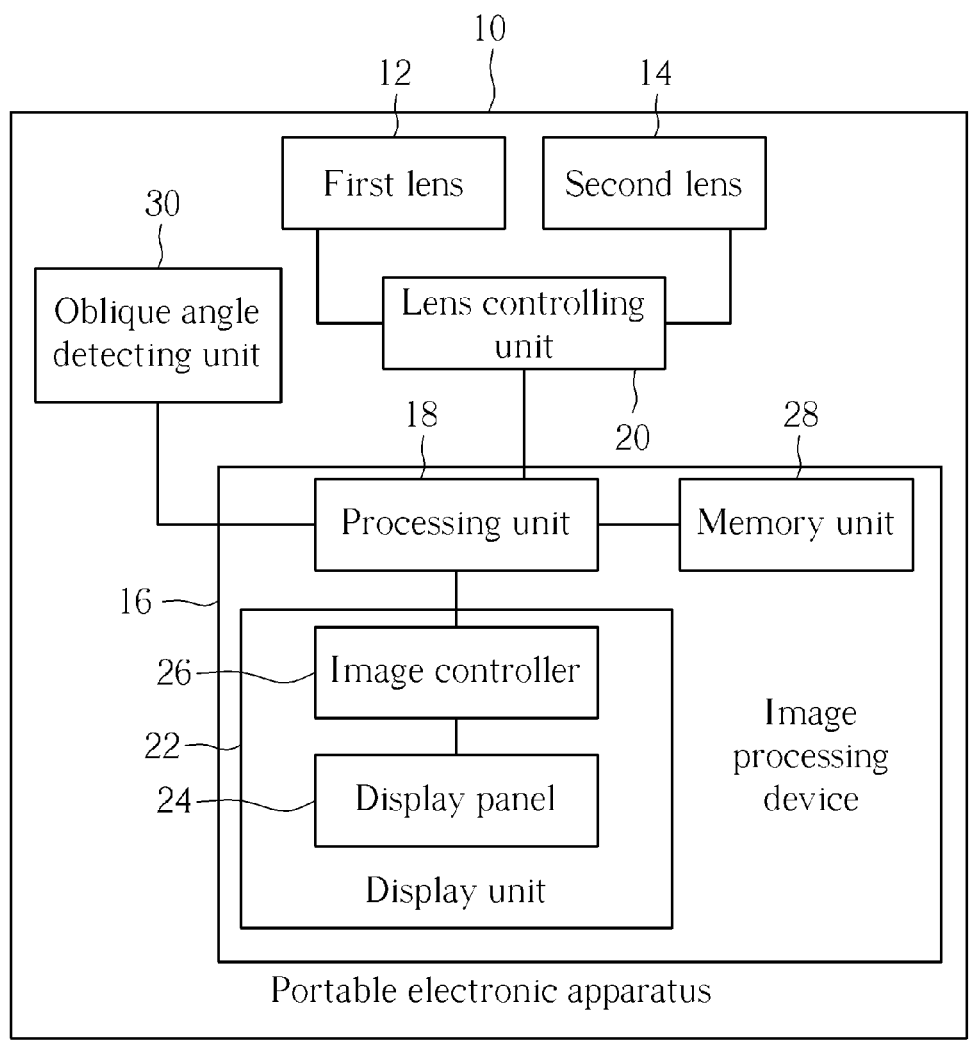
FIG. 1 is a functional diagram of a portable electronic apparatus according to an embodiment of the present invention.

Please refer to FIG. 1, which is a functional diagram of a portable electronic apparatus 10 according to an embodiment of the present invention. As shown in FIG. 1, the portable electronic apparatus 10 includes a first lens 12, a second lens 14, and an image processing device 16. The first lens 12 and the second lens 14 are used for capturing images toward an object respectively. The image processing device 16 includes a processing unit 18. The processing unit 18 is coupled to the first lens 12 and the second lens 14. The processing unit 18 is used for calculating a depth of field of a pixel in an image captured by the first lens 12 relative to the first lens 12. The processing unit 18 is further used for calculating a horizontal viewing angle between the pixel in the image captured by the first lens 12 and the second lens 14 according to the calculated depth of field, coordinates of the pixel in the image captured by the first lens 12, and a distance between the first lens 12 and the second lens 14. The processing unit 18 is further used for generating a translation image corresponding to the image captured by the first lens 12 according to the coordinates of the pixel in the image captured by the first lens 12, the distance between the first lens 12 and the second lens 14, the calculated depth of field, and the calculated horizontal viewing angle. The processing unit 18 could be hardware, software, or firmware. Furthermore, the portable electronic apparatus 10 could further include a lens controlling unit 20 coupled to the first lens 12, the second lens 14, and the processing unit 18. In this embodiment, the lens controlling unit 20 is used for controlling the first lens 12 and the second lens 14 to capture images respectively when the first lens 12 and the second lens 14 are arranged vertically.

Figure 2:
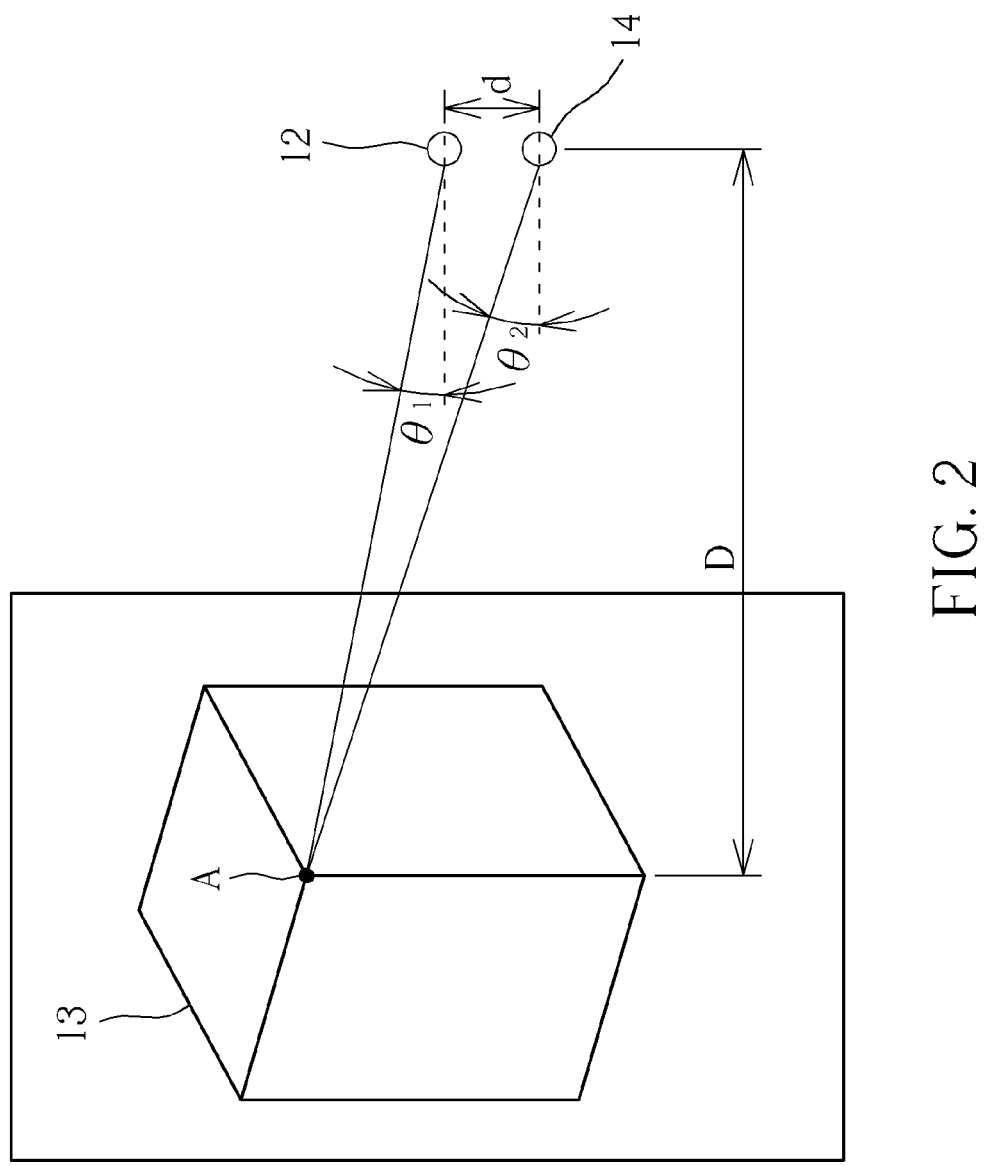
FIG. 2 is a diagram showing relationship of a first lens and a second lens in FIG. 1 and a pixel.
Figure 3:
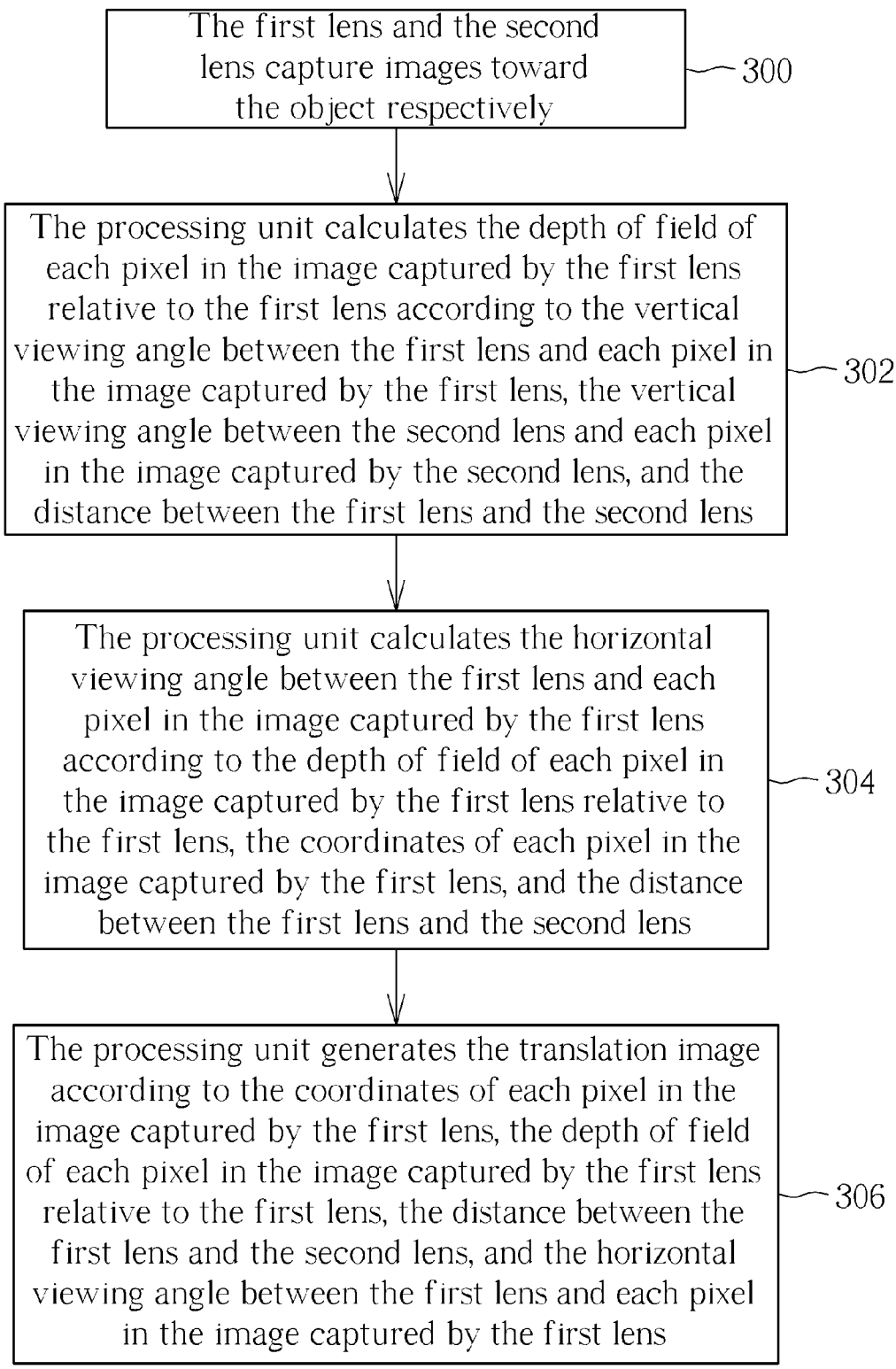
FIG. 3 is a flowchart of a method for generating a translation image according to an embodiment of the present invention.

Please refer to FIG. 1, FIG. 2, and FIG. 3. FIG. 2 is a diagram showing relationship of the first lens 12 and the second lens 14 in FIG. 1 and a pixel A. FIG. 3 is a flowchart of a method for generating a translation image according to an embodiment of the present invention. The method includes the following steps.

Step 300: the first lens 12 and the second lens 14 capture images toward an object 13 respectively;

Step 302: the processing unit 18 calculates a depth of field of each pixel in the image captured by the first lens 12 relative to the first lens 12 according to a vertical viewing angle between the first lens 12 and each pixel in the image captured by the first lens 12, a vertical viewing angle between the second lens 14 and each pixel in the image captured by the second lens 14, and a distance d between the first lens 12 and the second lens 14;

Step 304: the processing unit 18 calculates a horizontal viewing angle between the first lens 12 and each pixel in the image captured by the first lens 12 according to the depth of field of each pixel in the image captured by the first lens 12 relative to the first lens 12, coordinates of each pixel in the image captured by the first lens 12, and the distance d between the first lens 12 and the second lens 14;

Step 306: the processing unit 18 generates a translation image according to the coordinates of each pixel in the image captured by the first lens 12, the depth of field of each pixel in the image captured by the first lens 12 relative to the first lens 12, the distance d between the first lens 12 and the second lens 14, and the horizontal viewing angle between the first lens 12 and each pixel in the image captured by the first lens 12.

More detailed description for the aforesaid steps is provided as follows on condition that aforesaid steps are performed on the pixel A in FIG. 2. As for the related description for the other pixels in the image captured by the first lens 12, it could be reasoned according to the following description and therefore omitted herein. To be noted, amount of the pixels on which the aforesaid horizontal viewing angle transformation is performed depends on the practical application of the portable electronic apparatus 10. For example, in this embodiment, the portable electronic apparatus 10 could perform the aforesaid steps on each pixel in the image captured by the first lens 12 to generate a corresponding translation image, so as to improve the coordinate translation accuracy of the translation image. In another embodiment, the portable electronic apparatus 10 could perform the aforesaid steps on the specific pixels (e.g. the pixels corresponding to the outline of the object 13) or one single pixel (e.g. the pixel A in FIG. 2) in the image captured by the first lens 12, and then the portable electronic apparatus 10 could perform coordinate transformation on the other pixels according to the coordinate relationship of each pixel in the image captured by the first lens 12 for generating a corresponding translation image, so as to reduce the calculation amount of the processing unit 18 for increasing the image processing speed of the portable electronic apparatus 10.

On condition that the portable electronic apparatus 10 is placed vertically to make the first lens 12 and the second lens 14 arranged vertically (as shown in FIG. 2), as mentioned in Step 300, the first lens 12 and the second lens 14 could capture corresponding images toward the object 13 (briefly depicted as a cuboid in FIG. 2) respectively. To be more specific, the portable electronic apparatus 10 could utilize the lens controlling unit 20 to control the first lens 12 and the second lens 14 to capture images respectively when the lens controlling unit 20 determines that the first lens 12 and the second lens 14 are arranged vertically. Since the images captured by the first lens 12 and the second lens 14 could be regarded as the images having the same horizontal viewing angle but different vertical viewing angles, the images captured by the first lens 12 and the second lens 14 could be depicted in an image overlapping manner in FIG. 2, so as to clearly show the relationship of the first lens 12, the second lens 14, and the captured images.

After the aforesaid image capturing step is performed, as shown in FIG. 2, the processing unit 18 could calculate a depth of field D of the pixel A relative to the first lens 12 (Step 302) according to a vertical viewing angle $\theta_1$ between the pixel A and the first lens 12, a vertical viewing angle $\theta_2$ between the pixel A and the second lens 14, and a distance d between the first lens 12 and the second lens 14. To be more specific, in practical application, the depth of field D could conform to the following equation.

$$D = d/(\tan(\theta_2) - \tan(\theta_1)).$$

Subsequently, the processing unit 18 could establish the relative 3D coordinate relationship of the pixel A, the first lens 12 and the second lens 14 according to the coordinates of the pixel A and the depth of field D. The coordinates of the pixel A could be obtained after the first lens 12 captures the image toward the object 13. As for the related description for calculation of the coordinates of the other pixels in the aforesaid image, it is commonly seen in the prior art and therefore omitted herein. In such a manner, the processing unit 18 could calculate the horizontal viewing angle between the pixel A and the first lens 12 according to the relative 3D coordinate relationship of the pixel A, the first lens 12 and the second lens 14 and the distance d between the first lens 12 and the lens 14.

Finally, the processing unit 18 could calculate the depth of field of each pixel in the image captured by the first lens 12 according to the aforesaid steps, and then calculate the horizontal viewing angle between the first lens 12 and each pixel in the image captured by the first lens 12 (Step 304).

Accordingly, the processing unit 18 could generate the translation image (Step 306) according to the coordinates of each pixel in the image captured by the first lens 12, the depth of field of each pixel in the image captured by the first lens 12 relative to the first lens 12, the distance d between the first lens 12 and the second lens 14, and the horizontal viewing angle between the first lens 12 and each pixel in the image captured by the first lens 12, so that the translation image could be used as one of the left eye image and the right eye image for generate a stereoscopic image cooperatively with the image captured by the first lens 12 (could be used as the other one of the left eye image and the right eye image). To be noted, the method for forming the stereoscopic image adopted by the present invention is not limited to the aforesaid image overlapping method. For example, in another embodiment, the processing unit 18 could adopt the design that the image captured by the first lens 12 is utilized as a reference image and two translation images relative to the reference image are generated according to the aforesaid steps for forming a stereoscopic image cooperatively in an image overlapping manner. As for which method is utilized, it depends on the practical application of the portable electronic apparatus 10.

The aforesaid translation image generating process could be applied to the subsequent stereoscopic image processing of the portable electronic apparatus 10. That is, the portable electronic apparatus 10 could transmit the translation image generated by the processing unit 18 and the image captured by the first lens 12 to a display apparatus with a stereoscopic display function for displaying the stereoscopic image, or directly utilize the translation image generated by the processing unit 18 and the image captured by the first lens 12 to display the stereoscopic image if there is a display unit additionally disposed on the portable electronic apparatus 10. For example, in this embodiment, as shown in FIG. 2, the image processing device 16 could further include a display unit 22 coupled to the processing unit 18 for displaying the stereoscopic image according to the translation image generated by the processing unit 18 and the image captured by the first lens 12. In practical application, the display unit 22 could be a conventional display module including a display panel 24 and an image controller 26 (but not limited thereto). The image controller 26 is coupled to the processing unit 18 and the display panel 24. The image controller 26 is used for controlling the display panel 24 to display the stereoscopic image according to the translation image generated by the processing unit 18 and the image captured by the first lens 12. The image controller 26 could adopt a conventional display method, such as a time-multiplexed display method or a spatial-multiplexed display method, and the related description for the principle of the conventional display method is omitted herein since it is commonly seen in the prior art. Furthermore, the image processing device 16 could further include a memory unit 28 coupled to the processing unit 18 for storing the images captured by the first lens 12 and the second lens 14, the translation image generated by the processing unit 18, and the stereoscopic image displayed by the display unit 22.

Figure 4:
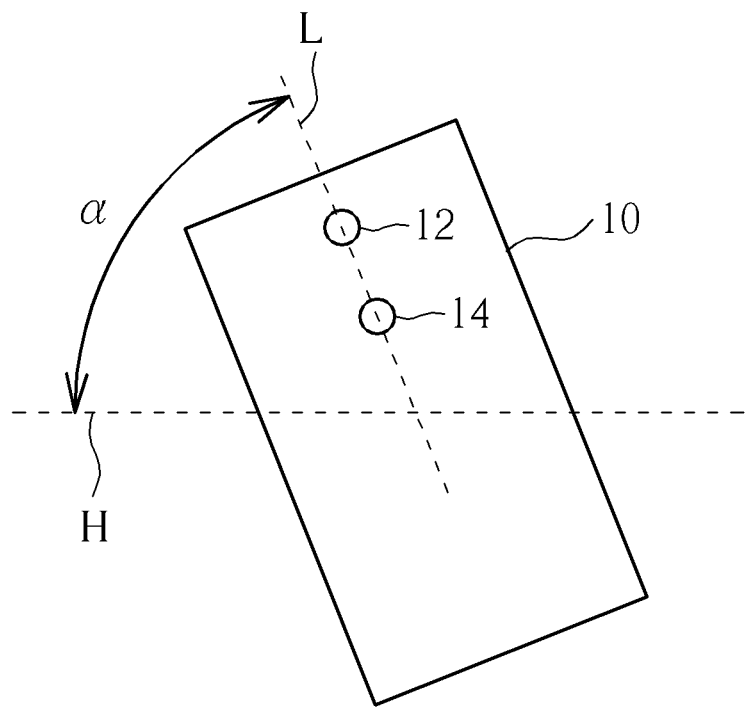
FIG. 4 is a diagram of the portable electronic apparatus in FIG. 1 being placed obliquely to make the first lens and the second lens arranged obliquely.

It should be mentioned that the present invention is also suitable for the condition that the portable electronic apparatus 10 is placed obliquely to make the first lens 12 and the second lens 14 arranged obliquely. For example, please refer to FIG. 2 and FIG. 4. FIG. 4 is a diagram of the portable electronic apparatus 10 in FIG. 1 being placed obliquely to make the first lens 12 and the second lens 14 arranged obliquely. As shown in FIG. 2, for making the portable electronic apparatus 10 capable of generating the translation image even if the first lens 12 and the second lens 14 are arranged obliquely, the portable electronic apparatus 10 could further include an oblique angle detecting unit 30 (e.g. an accelerometer). The oblique angle detecting unit 30 is coupled to the processing unit 18 for detecting an oblique angle α between an oblique arrangement direction L of the first lens 12 and the second lens 14 and a horizontal surface H. Accordingly, after the processing unit 18 calculates the vertical viewing angle between the first lens 12 and each pixel in the image captured by the first lens 12 and the vertical viewing angle between the second lens 14 and each pixel in the image captured by the second lens 14 respectively according to the oblique angle α by coordinate transformation, the portable electronic apparatus 10 could utilize the processing unit 18 to perform the aforesaid steps (i.e. Steps 302-306) for generating the translation image. The related calculation process could be reasoned according to the aforesaid description and therefore omitted herein.

In summary, via the aforesaid steps of calculating the depth of field according to the vertical viewing angles and calculating the horizontal viewing angle according to the depth of field, the present invention could still generate the translation image to form the stereoscopic image for the subsequent stereoscopic display of the portable electronic apparatus even if the two lenses of the portable electronic apparatus are not arranged transversely. In such a manner, the present invention could effectively solve the prior art problem that the portable electronic apparatus could not generate the stereoscopic image when the two lenses of the portable electronic apparatus are not arranged transversely, so as to greatly improve operation convenience and elasticity of the portable electronic apparatus in capturing images for forming stereoscopic images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a translation image, the method being applied to display of stereoscopic images on a portable electronic apparatus and comprising:
   a first lens of the portable electronic apparatus capturing a first image toward an object;
   a second lens of the portable electronic apparatus capturing a second image toward the object, the first image and the second image having different viewing angles, and the second lens being fixed at a position not arranged horizontally with the first lens;
   an image processing device of the portable electronic apparatus calculating a depth of field of each pixel in the first image relative to the first lens according to a first vertical viewing angle between each pixel in the first image and the first lens, a second vertical viewing angle between a corresponding pixel in the second image and the second lens, and a distance between the first lens and the second lens;
   the image processing device of the portable electronic apparatus calculating a horizontal viewing angle between each pixel in the first image and the first lens according to the depth of field of each pixel in the first image relative to the first lens, coordinates of each pixel in the first image, and the distance;
   an accelerometer detecting an oblique angle between an oblique arrangement direction of the first lens and the second lens relative to a horizontal surface when the first lens and the second lens are arranged obliquely;

the image processing device calculating the first vertical viewing angle and the second vertical viewing angle according to the oblique angle by coordinate transformation; and the image processing device of the portable electronic apparatus generating a translation image to be an image captured by the second lens, which is fixed relative to the first lens, regarding as being arranged horizontally with the first lens and being spaced apart from the first lens at the distance along a horizontal direction according to the coordinates of each pixel in the first image, the depth of field of each pixel in the first image relative to the first lens, the distance, and the horizontal viewing angle, wherein the depth of field conforms to the following equation:

the depth of field=(the distance)/[tan(the second vertical viewing angle)−tan(the first vertical viewing angle)].

2. The method of claim 1 further comprising:
the image processing device displaying a stereoscopic image according to the at least one translation image and the first image.

3. The method of claim 1, wherein the first lens and the second lens capture the first image and the second image respectively when being arranged vertically.

4. A portable electronic apparatus comprising:
a first lens for capturing a first image toward an object;
a second lens located at a side of the first lens for capturing a second image toward the object, the first image and the second image having different viewing angles, the second lens being away from the first lens at a distance, and the second lens being fixed at a position not arranged horizontally with the first lens;
an image processing device comprising:
a processing unit of the portable electronic apparatus coupled to the first lens and the second lens for calculating a depth of field of each pixel in the first image relative to the first lens according to a first vertical viewing angle between each pixel in the first image and the first lens, a second vertical viewing angle between a corresponding pixel in the second image and the second lens, and the distance, the processing unit being further for calculating a horizontal viewing angle between each pixel in the first image and the first lens according to the depth of field of each pixel in the first image relative to the first lens, coordinates of each pixel in the first image, and the distance, and the processing unit being further for generating at least one translation image to be an image captured by the second lens, which is fixed relative to the first lens, regarding as being arranged horizontally with the first lens and being spaced apart from the first lens at the distance along a horizontal direction according to the coordinates of each pixel in the first image, the depth of field of each pixel in the first image relative to the first lens, the distance, and the horizontal viewing angle, wherein the processing unit calculates the depth of field according to the following equation:

the depth of field=(the distance)/[tan(the second vertical viewing angle)−tan(the first vertical viewing angle)]; and an accelerometer coupled to the processing unit for detecting an oblique angle between an oblique arrangement direction of the first lens and the second lens relative to a horizontal surface when the first lens and the second lens are arranged obliquely;

wherein the processing unit is further for calculating the first vertical viewing angle and the second vertical viewing angle according to the oblique angle by coordinate transformation.

5. The portable electronic apparatus of claim 4 further comprising:
a display unit of the portable electronic apparatus coupled to the processing unit for displaying a stereoscopic image according to the at least one translation image and the first image.

6. The portable electronic apparatus of claim 5, wherein the display unit comprises:
a display panel for displaying the stereoscopic image; and
an image controller coupled to the processing unit and the display panel for controlling the display panel to display the stereoscopic image according to the at least one translation image and the first image.

7. The portable electronic apparatus of claim 5, wherein the image processing device further comprises a memory unit of the portable electronic apparatus coupled to the processing unit for storing the first image, the second image, the at least one translation image, and the stereoscopic image.

8. The portable electronic apparatus of claim 4 further comprising:
a lens controlling unit of the portable electronic apparatus coupled to the first lens, the second lens, and the processing unit for controlling the first lens and the second lens to capture the first image and the second image respectively when the first lens and the second lens are arranged vertically.

* * * * *